(12) United States Patent
Ishimatsu (10) Patent No.: US 10,984,566 B2
(45) Date of Patent: Apr. 20, 2021

(54) IMAGE PROCESSING APPARATUS THAT CALCULATES USING LUMINANCE VALUES OF ONE OR MORE INPUT IMAGES PRODUCED BY PHOTOELECTRIC CONVERSION OF MULTIPLE POLARIZED LIGHTS, IMAGE-CAPTURING APPARATUS AND IMAGE PROCESSING METHOD

(71) Applicant: CANON KABUSHIKI KAISHA, Tokyo (JP)

(72) Inventor: Rie Ishimatsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 15/622,393

(22) Filed: Jun. 14, 2017

(65) Prior Publication Data
US 2017/0372501 A1 Dec. 28, 2017

(30) Foreign Application Priority Data
Jun. 22, 2016 (JP) .............................. JP2016-123212

(51) Int. Cl.
*G06T 11/60* (2006.01)
*G06K 9/20* (2006.01)
(Continued)

(52) U.S. Cl.
CPC .............. *G06T 11/60* (2013.01); *G06K 9/209* (2013.01); *G06K 9/4661* (2013.01); *G06K 9/52* (2013.01); *H04N 7/183* (2013.01)

(58) Field of Classification Search
CPC .. G06T 1/00; G06T 7/55; G06T 7/514; H04N 5/2256; H04N 5/23229; H04N 5/238; G02B 5/3025
See application file for complete search history.

(56) References Cited

U.S. PATENT DOCUMENTS

2005/0040774 A1* 2/2005 Mueller ............... H05B 47/155
  315/291
2009/0245775 A1* 10/2009 Osawa ................... G03B 15/02
  396/61
(Continued)

FOREIGN PATENT DOCUMENTS

JP 2006259818 A 9/2006
JP 2007086720 A 4/2007
(Continued)

OTHER PUBLICATIONS

Office Action issued in Japanese Appln. No. 2016-123212 dated Apr. 7, 2020. English translation provided.

*Primary Examiner* — Yosef K Laekemariam
(74) *Attorney, Agent, or Firm* — Rossi, Kimms & McDowell LLP (57) ABSTRACT

The image processing apparatus includes a calculator configured to calculate, using luminance values of one or more input images produced by photoelectric conversion of multiple polarized lights whose polarization angles are mutually different, an angle-dependent component at a specific polarization angle among angle-dependent components that are luminance components changing depending on the polarization angle. The apparatus further includes a producer configured to produce an output image using the angle-dependent component at the specific polarization angle.

17 Claims, 9 Drawing Sheets

(51) Int. Cl.
*G06K 9/46* (2006.01)
*G06K 9/52* (2006.01)
*H04N 7/18* (2006.01)

(56) References Cited

U.S. PATENT DOCUMENTS

| | | | | |
|---|---|---|---|---|
| 2010/0066864 A1* | 3/2010 | Abe | ............ | H04N 5/23209 |
| | | | | 348/240.3 |
| 2010/0194931 A1* | 8/2010 | Kawaguchi | ............ | H04N 5/232 |
| | | | | 348/240.99 |
| 2011/0117959 A1* | 5/2011 | Rolston | ............ | A46B 7/04 |
| | | | | 455/556.1 |
| 2011/0267483 A1* | 11/2011 | Kanamori | ............ | G06T 1/00 |
| | | | | 348/220.1 |
| 2013/0135453 A1 | 5/2013 | Kanamori | | |
| 2014/0092227 A1* | 4/2014 | Kanamori | ............ | G01J 1/0209 |
| | | | | 348/68 |
| 2015/0350511 A1* | 12/2015 | Kaikumaa | ............ | G03B 7/00 |
| | | | | 348/363 |

FOREIGN PATENT DOCUMENTS

| | | |
|---|---|---|
| JP | 2010104421 A | 5/2010 |
| JP | 2010121935 A | 6/2010 |
| JP | 2013074400 A | 4/2013 |
| JP | 2014183516 A | 9/2014 |
| JP | 2015172926 A | 10/2015 |
| WO | 2013175686 A1 | 11/2013 |

\* cited by examiner

FIG. 8A  $\alpha 0=0°$

FIG. 8B  $\alpha 0=45°$

FIG. 8C  $\alpha 0=90°$

FIG. 8D  $\alpha 0=135°$ k=0

FIG. 10C $A\cos^2[(45+90-\theta)]$

FIG. 11A

$A\cos^2[2(45+90-\theta)]$

FIG. 11B $A\cos^2[3(45+90-\theta)]$

FIG. 11C $A\cos^2[(45+90-\theta)]+B$

FIG. 12A

$A\cos^2[2(45+90-\theta)]+B$

FIG. 12B $A\cos^2[3(45+90-\theta)]+B$

IMAGE PROCESSING APPARATUS THAT CALCULATES USING LUMINANCE VALUES OF ONE OR MORE INPUT IMAGES PRODUCED BY PHOTOELECTRIC CONVERSION OF MULTIPLE POLARIZED LIGHTS, IMAGE-CAPTURING APPARATUS AND IMAGE PROCESSING METHOD

BACKGROUND OF THE INVENTION

Field of the Invention

The present invention relates to produce, using an image acquired by image capturing of multiple polarized lights whose polarization directions are mutually different, a desired image after image capturing.

Description of the Related Art

A three-dimensional computer graphic (3DCG) technique is known that can arbitrarily change illumination conditions of an object image in an image (captured image) acquired by image capturing of an object; the illumination conditions include a type of illumination, number and arrangement thereof, and illuminated range and direction relative to the object. This technique can reproduce an object image under desired illumination conditions by calculation based on three-dimensional data on the object relating to its shape, reflective characteristic and illumination. Japanese Patent Laid-Open No. 2006-259818 discloses a 3DCG technique that produces a three-dimensional image by combining three-dimensional data and normal vector data of an object and further data on an illumination direction relative to the object. However, this 3DCG technique requires a complex measurement for acquiring the above data and increases a data amount to be held and a calculation amount. In addition, this 3DCG technique requires specifying an illumination condition for expressing a desired texture of the object, which increases a user's burden.

On the other hand, as a technique to produce a desired image from a captured image, Japanese Patent Laid-Open No. 2007-086720 discloses a polarization imaging method that divides light from an object into a polarized light and a non-polarized light and removes or extracts one of the polarized and non-polarized lights to produce various images. This polarization imaging method enables, by, for example, extracting a non-polarized light in a captured image of a car, an image in which light from a front glass of the car is removed and thereby objects inside the car are captured.

However, Japanese Patent Laid-Open No. 2007-086720 fails to disclose a polarization imaging method that can arbitrarily change an illumination direction relative to the object (that is, a reflection direction of light from the object).

SUMMARY OF THE INVENTION

The present invention provides an image processing apparatus and image-capturing apparatus that are capable of producing, using a captured image, an image in which an illumination direction to an object is arbitrarily selected.

The present invention provides as an aspect thereof an image processing apparatus including a calculator configured to calculate, using luminance values of one or more input images produced by photoelectric conversion of multiple polarized lights whose polarization angles are mutually different, an angle-dependent component at a specific polarization angle among angle-dependent components that are luminance components changing depending on the polarization angle, and a producer configured to produce an output image using the angle-dependent component at the specific polarization angle.

The present invention provides as another aspect thereof an image-capturing apparatus including an image sensor and the above image processing apparatus.

The present invention provides as yet another aspect thereof an image processing method including a step of calculating, using luminance values of one or more input images produced by photoelectric conversion of multiple polarized lights whose polarization angles are mutually different, an angle-dependent component at a specific polarization angle among angle-dependent components that are luminance components changing depending on the polarization angle, a step of producing an output image using the angle-dependent component at the specific polarization angle.

The present invention provides as further another aspect thereof a non-transitory computer-readable storage medium for storing a computer program to cause a computer to execute the above image processing method.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Prior to description of specific embodiments, description will be made of common subject matters to the embodiments. Each embodiment performs the following image process using one or more input images produced by photoelectric conversion (hereinafter also referred to as "image capturing") of multiple polarized lights from an object. The multiple polarized lights have mutually different polarization angles α. The image process calculates, using luminance values of the input image, an angle-dependent component at a specific polarization angle among angle-dependent components that are luminance components changing depending on the polarization angle α. The image process further produces an output image using the angle-dependent component at the specific polarization angle and thereby provides an output image in which an illumination direction relative to an object is arbitrarily and intuitively selected (or adjusted).

Figure 14A:
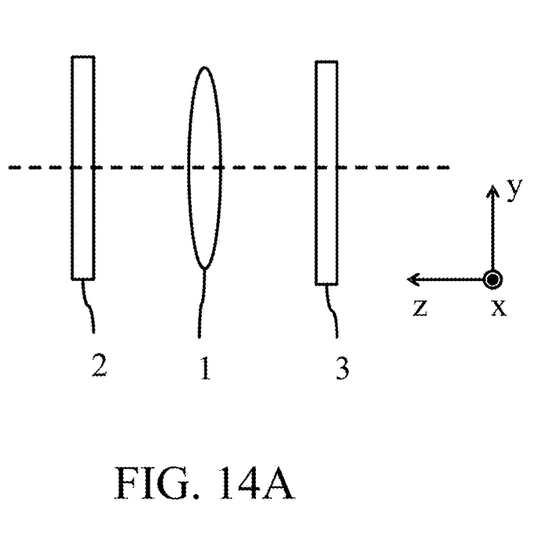
FIGS. 14A and 14B illustrate polarization elements used in Embodiments 1 to 4.
Figure 14B:
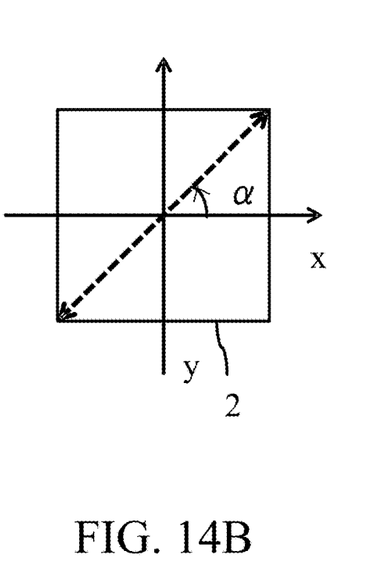

First, description will be made of a definition of the polarization angle α with reference to FIGS. 14A and 14B. FIG. 14A illustrates a configuration of an image-capturing system (for example, a digital camera) that acquires the input image and illustrates a relation of coordinate axes with the image-capturing system. The image-capturing system is constituted by a polarizer 2, an optical system 1, and an image sensor 3. The coordinate axes includes a z-axis in which an optical axis (illustrated by a broken line in FIG. 14A) of the optical system 1 extends, and an x-axis and a y-axis that are orthogonal to each other in an x-y plane orthogonal to the z-axis. As illustrated in FIG. 14B, when a polarized light (illustrated by a broken arrow) transmitted through the polarizer 2 having a polarization axis in the x-y plane is captured by the image sensor 3, an angle of a polarization direction of the polarized light relative to the x-axis as a reference axis is defined as the polarization angle α of the polarized light. The polarization angle α is an angle in a range of 0°≤α<180°. Although each embodiment defines the angle of the polarization direction of the polarized light relative to the x-axis as the polarization angle α, the polarization angle α is not limited thereto and may be an angle relative to the y-axis. The polarization angle α may be expressed in an arbitrary coordinate system in which the polarization angle α is uniquely defined.

Next, description will be made of a principle of adjusting the illumination direction using the angle-dependent component as the luminance component changing depending on the polarization angle α. When luminance values I of pixels in multiple input images (or one input image as described later) produced by image capturing of multiple polarized lights whose polarization angles α are mutually different are plotted at respective polarization angles α, the luminance value I of each pixel is expressed as following expression (1):

$$I = Ic + I(\alpha) \quad (1)$$

where $I(\alpha)$ represents the angle-dependent component as the luminance component changing depending on the polarization angle α, and Ic represents an angle-independent component as a luminance component not changing depending on the polarization angle α.

The image process in each embodiment considers the angle-dependent component $I(\alpha)$ as a specular reflection component and considers the angle-independent component Ic as a diffuse reflection component (hereinafter simply referred to as "a diffuse component"). This is because the specular reflection component generated by Fresnel reflection includes a larger amount of an s-polarized component than that of a p-polarized component and thereby has a tendency to have an angular dependency, and on the other hand the diffusive component loses its angular dependency in its diffuse process and thereby has a tendency to have no angular dependency.

Furthermore, the present inventor has found that a specular reflection component generated when the object is illuminated from one specific direction α0 can be approximated using a projection component of the angle-dependent component $I(\alpha)$ in a direction of α0+90 (degrees).

A captured image acquired when the object is illuminated from the specific illumination direction α0 is expressed as follows:

(diffuse component)+(specular reflection component from the object illuminated from the direction α0). Therefore, the above approximation enables expressing a luminance value (approximated value) I' of each pixel when the object is illuminated from the direction α0, using the angle-independent component Ic and an angle-dependent component $I(\alpha0+90)$ as following expression (2):

$$I' = Ic + I(\alpha0+90). \quad (2)$$

That is, the luminance value I' is expressed as a linear sum of the angle-independent component Ic and the angle-dependent component $I(\alpha0+90)$. Therefore, calculating the luminance value I' of each pixel using expression (2) enables producing (synthesizing) an image acquired when the object is illuminated from the direction α0.

Moreover, expression (2) may be expressed as following expression (3) using arbitrary coefficients kc and k:

$$I' = kc \cdot Ic + k \cdot I(\alpha0+90). \quad (3)$$

Changing kc and k provides an adjusting effect on a ratio between the specular reflection component and the diffuse component.

Although the description was made of the method of producing the image acquired when the object is illuminated from the specific direction α0, the direction of illuminating the object is not limited to one direction. That is, an image acquired when the object is illuminated from multiple directions can be produced.

Luminance values I' of each pixel in such an image can be expressed by expressions (4) and (5) using polarization angles α1, α2, . . . , αn and arbitrary coefficients k1, k2, . . . , kn.

$$I' = Ic \Sigma I(\alpha n+90) \quad (4)$$

$$I' = kc \cdot Ic + \Sigma[kn \cdot I(\alpha n+90)] \quad (5)$$

Each embodiment uses the above-described principle to provide an adjusting effect on the illumination direction relative to the object by image processing after image capturing.

Next, a detailed description will be made of a procedure of the image process (that is, an image processing method) in each embodiment. The image processing method in each embodiment includes three steps that are (1) an image acquiring process, (2) a polarization data acquiring step, and (3) an image synthesizing step.

(1) Image Acquiring Step

The image acquiring step acquires one input image or multiple input images. The input image is a digital image produced by image capturing of a polarized light transmitted through the optical system and the polarizer and captured by the image sensor. The polarizer is an element capable of controlling a direction (angle) of a transmission axis of a polarized light transmitted therethrough. The direction of the transmission axis of the polarized light corresponds to the polarization direction of the polarized light, that is, the polarization angle α.

As a simplest polarizer, a polarizer 2 illustrated in FIGS. 14A and 14B can be used. Rotating the polarizer 2 in the x-y plane about an axis orthogonal to the x-y plane enables controlling the direction of the transmission axis (that is, the polarization angle α).

Figure 15:
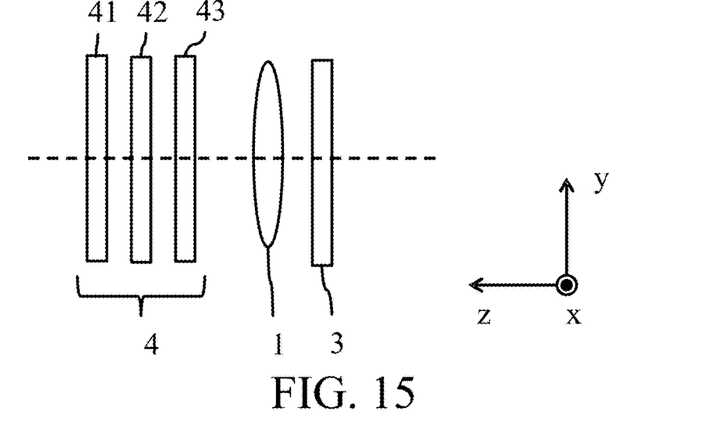
FIG. 15 illustrates another polarization element used in each embodiment.

Alternatively, as another polarizer, a polarizer 4 constituted by multiple elements as illustrated in FIG. 15 can be used. The polarizer 4 is constituted by a quarter retarder 41, a liquid crystal variable retarder 42, and a polarizer 43.

Figure 16:
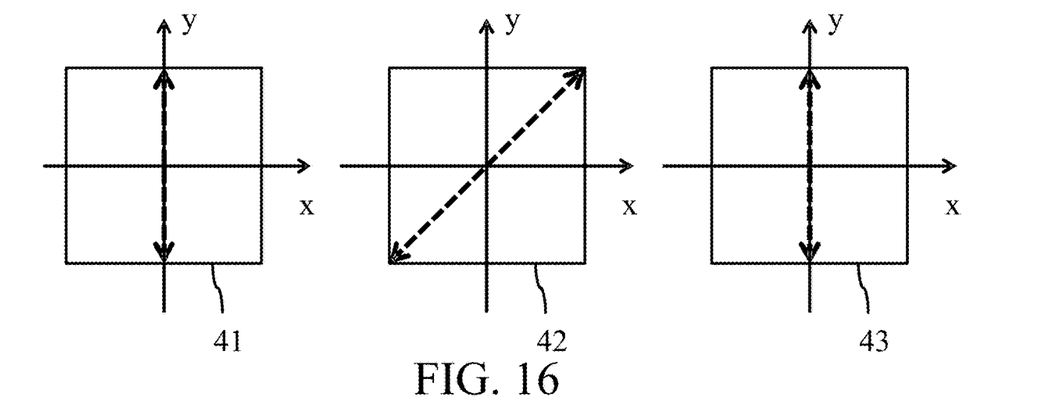
FIG. 16 illustrates a configuration of the polarization element illustrated in FIG. 15.

FIG. 16 illustrates directions of transmission axes of the quarter retarder 41, the liquid crystal variable retarder 42 and the polarizer 43 constituting the polarizer 4. The liquid crystal variable retarder provides a phase difference to light transmitted therethrough and is capable of changing the phase difference depending on a voltage applied to this retarder 42. Therefore, controlling the applied voltage to the liquid crystal variable retarder 42 enables changing the direction of the transmission axis of the entire polarizer 4, which provides the same effect as the rotation of the polarizer 2 illustrated in FIGS. 14A and 14B. Since controlling the applied voltage to the liquid crystal variable retarder 42 enables changing the polarization angle α of the polarized light exiting from the polarizer 4 as described above, using this polarizer 4 enables changing the polarization angle α faster than rotating the polarizer 2. Accordingly, using the polarizer 4 enables shortening a time required for image capturing for acquiring the multiple input images whose polarization angles α are mutually different.

Figure 17A:
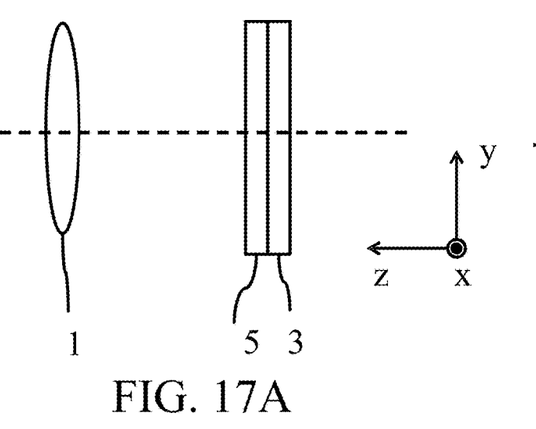
FIGS. 17A and 17B illustrate other polarization elements used in Embodiments 1 to 4.
Figure 17B:
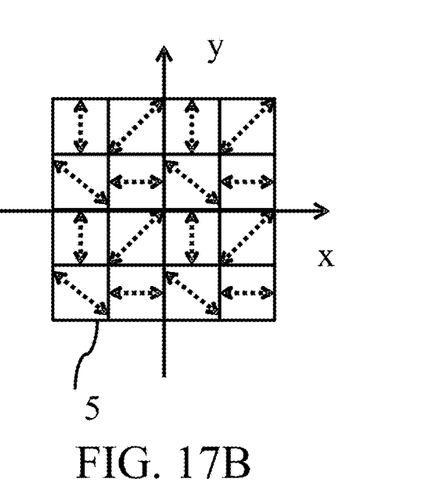

As further another polarizer, a polarizer 5 illustrated in FIGS. 17A and 17B may be used that is a polarizer array in which multiple polarizers are arranged in the x-y plane. As illustrated in FIG. 17B, among the multiple polarizers, four polarizers whose directions of transmission axes (illustrated by broken arrows) are mutually different are grouped in one polarizer group, and multiple polarizer groups are arranged in the x-y plane. The polarizer 5 is integrated with the image sensor 3 or disposed near the image sensor 3, and enables each pixel or each pixel area including multiple pixels of the image sensor 3 to perform image capturing of polarized lights whose polarization angles α are mutually different. One input image acquired by this image capturing is an image whose each pixel or each pixel area including multiple pixels includes luminance data of the polarized lights whose polarization angles α are mutually different.

That is, the one input image can provide the luminance data of the multiple polarized lights.

Each embodiment acquires, as the input image(s), multiple captured images or one captured image acquired by image capturing of the polarized lights whose polarization angles α are mutually different. When acquiring the input image(s), it is desirable to hold the multiple captured images of the polarized lights whose polarization angles α are mutually different as one file or in relation to one another using Exif information.

The input image can be acquired by any methods. When an image processing apparatus performing the above image process is built in an image-capturing apparatus including an image sensor, the image processing apparatus may directly acquire the input image in the image-capturing apparatus. When the image processing apparatus is provided separately from the image-capturing apparatus, a wired or wireless communicable connection therebetween enables the image processing apparatus to acquire the input image from the image-capturing apparatus through the communication. Alternatively, the image processing apparatus may acquire the input image via a recording (storage) medium such as a memory card in which the input image is recorded (stored) by the image-capturing apparatus.

(2) Polarization Data Acquiring Step

The polarization data acquiring step extracts the luminance values I of the pixels from the input image(s) acquired in the image acquiring step, calculates the angle-dependent component I(α) from the luminance values I and calculates as needed the angle-independent component Ic. The angle-independent component Ic may be calculated together with the angle-dependent component I(α). However, it is not necessarily needed to calculate the angle-independent component Ic. When the angle-independent component Ic is not directly calculated, the angle-independent component Ic may be indirectly calculated using the luminance values I and expression (1).

Description will hereinafter be made of a method of calculating the angle-dependent component I(α). The angle-dependent component I(α) is a luminance component changing depending on the polarization angle α of the polarized light, so that it can be expressed by an arbitrary sine or cosine function having a cycle of 180°. For example, the angle-dependent component I(α) can be expressed by following expression (6) where A represents a maximum value of the angle-dependent component I(α), and θ represents a polarization angle α at which the angle-dependent component I(α) becomes the maximum value A:

$$I(\alpha) = A \cos^2(\alpha - \theta). \quad (6)$$

The luminance value I of each pixel can be expressed by following expression (7):

$$I = A \cos^2(\alpha - \theta) + Ic. \quad (7)$$

Calculating the maximum value A and the polarization angle θ from the input image(s) acquired by image capturing of three or more polarized lights whose polarization angles α are mutually different using expression (6) or (7) enables providing the angle-dependent component I(α).

Figure 1A:
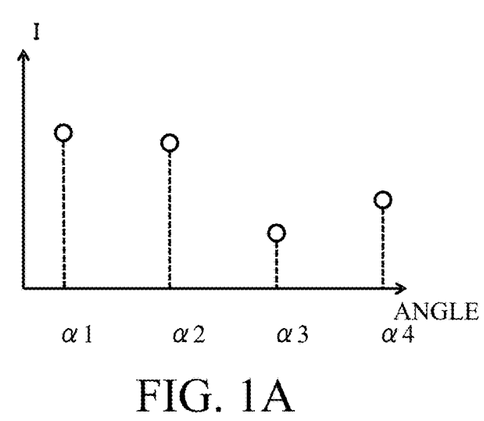
FIGS. 1A and 1B illustrates calculation of an approximation function $F(\alpha)$ indicating an angle-dependent component of a light intensity I in an embodiment of the present invention.
Figure 1B:
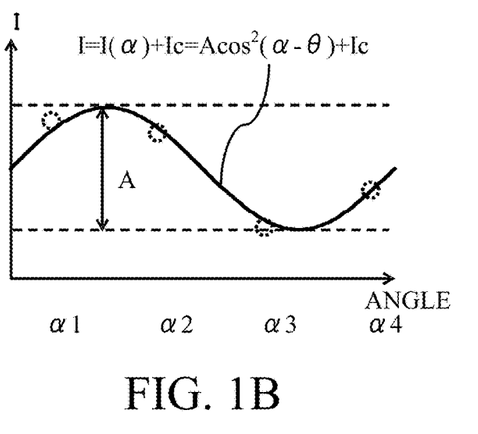

FIGS. 1A and 1B illustrate an example of the method of calculating the angle-dependent component I(α). This example shows a case where four input images are acquired by image capturing of four polarized lights whose mutually different polarization angles are α1, α2, α3 and α4. Plotting luminance values I(α1), I(α2), I(α3) and I(α4) of four mutually corresponding pixels in the four input images provides a graph of FIG. 1A. Since the angle-dependent component I(α) can be expressed by the 180°-cycle sine or cosine function as described above, using expression (6) or (7) enables performing fitting to the luminance values I(α1) to I(α4) illustrated in FIG. 1A. FIG. 1B illustrates a result of the fitting using expression (7). In FIG. 1B, four dotted circles shows the luminance values I(α1) to I(α4) acquired from the four input images, and a solid curved line (function) shows a change in luminance value, which is acquired by the fitting, depending on the polarization angle α. When three luminance values are acquired from the three input values, A and θ (and Ic as needed) can be uniquely calculated. Furthermore, when four or more luminance values are acquired from four or more input values, A and θ (and Ic as needed) can be calculated using an optimization method such as a least squares method.

(3) Image Synthesizing Step

The image synthesizing step performs image synthesizing using the angle-dependent component I(α) calculated at the polarization data acquiring step to produce an output image. As described above, the luminance value (approximated value) I' of the specular reflection component acquired when the object is illuminated from the direction α0 can be calculated as the angle-dependent component I(α0+90) at the direction α0+90 (degrees). Thus, the luminance value I' of each pixel acquired when the object is illuminated from the direction α0 can be expressed using expressions (2) and (6) as following expression (8):

$$I'=Ic+A\cos^2(\alpha 0+90-\theta). \quad (8)$$

The luminance value I' may be expressed using expression (3) as following expression (9):

$$I'=kc \cdot Ic+k \cdot A\cos^2(\alpha 0+90-\theta). \quad (9)$$

The image synthesizing step calculates the luminance value I' of each pixel using expression (8) or (9) to synthesize (produce) an output image acquired when the object is illuminated from the direction α0. The image synthesizing step may calculate, in a case of synthesizing an output image acquired when the object is illuminated from multiple directions, the luminance value I' using following expressions (10) and (11) derived from expressions (4) and (5).

$$I'=Ic+\Sigma A\cos^2(\alpha n+90-\theta) \quad (10)$$

$$I'=kc \cdot Ic+\Sigma[kn \cdot A\cos^2(\alpha n+90-\theta)] \quad (11)$$

Although the above description used the angle-dependent component I(α) for approximating the specular reflection component acquired when the object is illuminated from the direction α0, another method may be employed that approximates the angle-dependent component I(α) using another function F(α) to calculate the luminance value I' using this approximation function F(α). In this case, the luminance value I' of each pixel can be expressed using following expressions (12) to (15), instead of expressions (2) to (5).

$$I'=Ic+F(\alpha 0+90) \quad (12)$$

$$I'=kc \cdot Ic+k \cdot F(\alpha 0+90) \quad (13)$$

$$I'=Ic+\Sigma F(\alpha n+90) \quad (14)$$

$$I'=kc \cdot Ic+\Sigma[kn \cdot F(\alpha n+90)] \quad (15)$$

Although an arbitrary function may be used as the approximation function F(α), it is desirable that a polarization angle at which a maximum value of the approximation function F(α) is obtained coincide with that at which the maximum value of the angle-dependent component I(α) is obtained. However, the above coincidence of the polarization angles may include a slight error, that is, permit a difference therebetween in a range from several percent to more than ten percent.

Figure 2A:
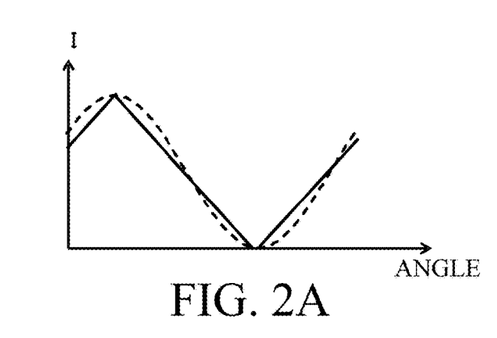
FIGS. 2A to 2C illustrate an example of another approximation function $F(\alpha)$ in the embodiment.
Figure 2B:
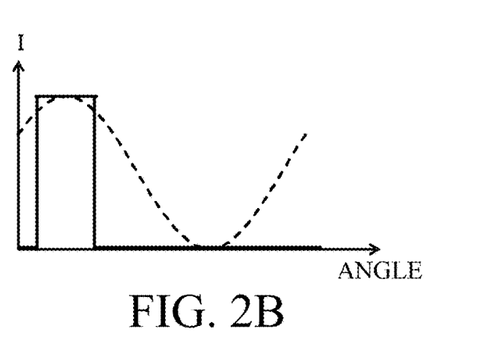
Figure 2C:
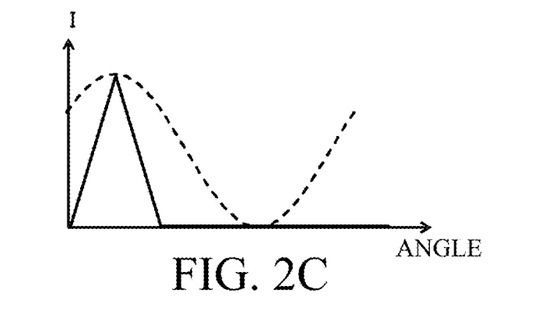

FIG. 2A to 2C illustrate examples of the approximation functions F(α). In these drawings, broken curved lines correspond to the angle-dependent component I(α) illustrated in FIG. 1B, and solid curved lines show the approximation functions F(α). As illustrated in these drawings, using an arbitrary approximation function F(α) enables making the change in the luminance value depending on the polarization angle α different from that of the angle-dependent component I(α). Therefore, using the approximation function F(α) for approximating the specular reflection component provides an adjusting effect on an area (illuminated area or width) where the object in the synthesized output image is illuminated and on an illumination luminance distribution.

Embodiment 1

Figure 3:
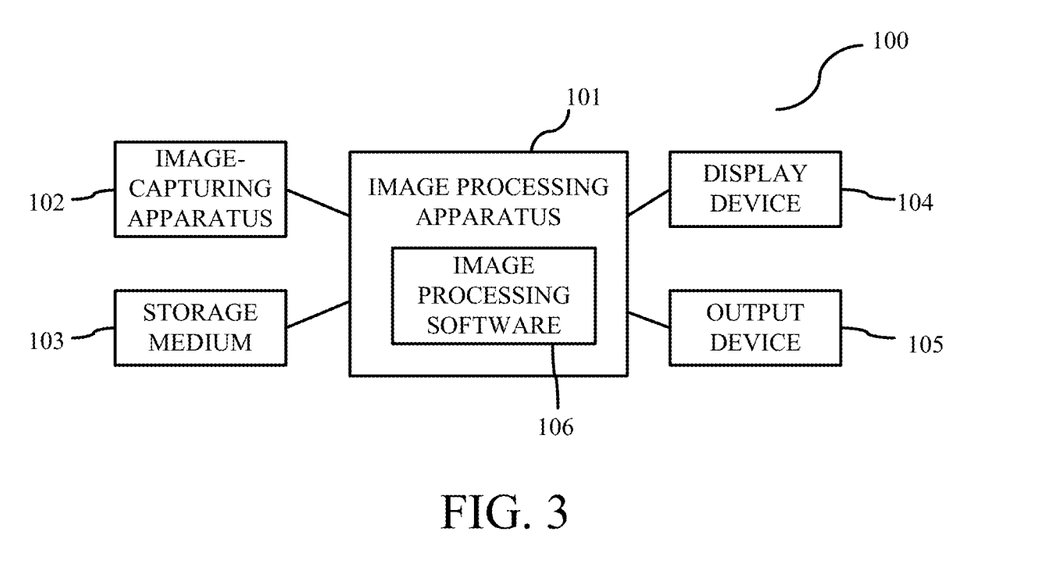
FIG. 3 illustrates a configuration of an image processing process including an image processing apparatus of Embodiment 1.

Next, with reference to FIG. 3, description will be made of an image processing apparatus that is a first embodiment (Embodiment 1) of the present invention. FIG. 3 illustrates a configuration of an image processing system 1000 including the image processing apparatus of this embodiment.

The image processing apparatus 101 as a computer stores image processing software (an image processing program as a computer program) 106 and executes an image process described in each of Embodiments 2 to 4 according to the image processing software 106. The image processing apparatus 101 serves as a calculator and a producer.

Figure 4:
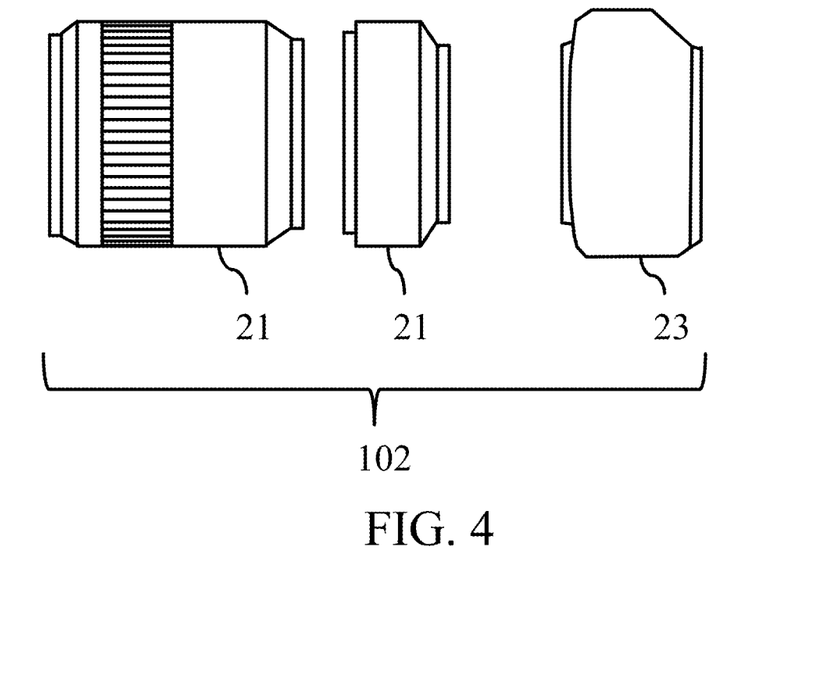
FIG. 4 illustrates a configuration of an image-capturing apparatus in Embodiment 1.

An image-capturing apparatus 102 such as a camera, a telescope, an endoscope or a scanner acquires a captured image by image capturing. FIG. 4 illustrates, as an example of the image-capturing apparatus 102, a lens-interchangeable camera. The lens-interchangeable camera is constituted by an interchangeable lens 21, an adapter 22 and a digital camera body 23. The adapter 22 includes a polarizer that changes a polarization angle α of a polarized light transmitted therethrough; the polarizer is one of the polarizers illustrated in FIGS. 14A and 14B and FIG. 15. Changing the polarization angle α of the polarized light exiting from the adapter 22 enables the digital camera body 23 to capture multiple polarized lights whose polarization angles α are mutually different.

The adapter 22 further includes a lens mount and a camera mount and thereby is connectable to and usable with various interchangeable lenses and digital camera bodies.

The digital camera body 23 includes an image sensor such as a CMOS sensor to capture the polarized light passing through the interchangeable lens 21 and the adapter 22.

Although in FIG. 4 the polarizer (adapter 22) is disposed between the interchangeable lens 21 and the digital camera body 23, the polarizer may be disposed on an object side further than the interchangeable lens 21.

Alternatively, without using the adapter 22, the polarizer as the polarizer array illustrated in FIGS. 17A and 17B may be provided integrally with or immediately before the image sensor in the digital camera body 23.

A storage medium 103 such as a semiconductor memory, a hard disc or a server on a network stores the captured image.

The image processing apparatus 101 acquires, from the image-capturing apparatus 102 through wired or wireless communication therewith or from the storage medium 103 by reading therefrom, an input image(s) as the captured image(s). Then, the image processing apparatus 101 performs any one of the image processes described in Embodiments 2 to 4 to produce an output image and outputs the output image to at least one of an output device 105, the image-capturing apparatus 102 and the storage medium 103. The image processing apparatus 101 also can store the output image to its internal memory. The output device 105 is, for example, a printer.

The image processing apparatus 101 is also connected to a display device 104. Thus, a user can perform, while watching the display device 104, works for the image process and evaluation of the produced output image. The image processing apparatus 101 may perform as needed, in addition to any one of the image processes described in Embodiments 2 to 4, other image processes such as an image development process and an image restoration process. Although this embodiment describes the case where the image processing apparatus 101 is provided separately from the image-capturing apparatus 102, the image processing apparatus 101 may be built in the image-capturing apparatus 102.

Embodiment 2

Figure 5:
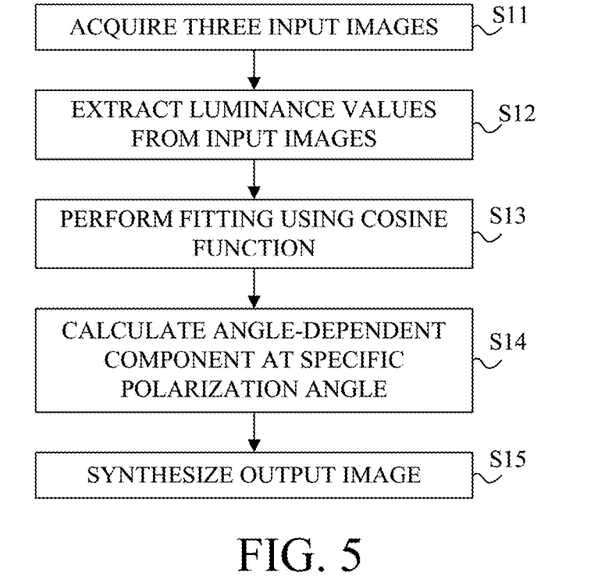
FIG. 5 is a flowchart of an image process in Embodiment 1.

Description will be made of an image process, which is performed by the image processing apparatus 101 described in Embodiment 1, as a second embodiment (Embodiment 2) of the present invention. This embodiment produces an output image from three input images acquired by image capturing of three polarized lights whose polarization directions α are 20°, 65° and 110°. FIG. 5 is a flowchart illustrating the image process performed by the image processing apparatus 101. Step S11 corresponds to the above-described image acquiring step, steps S12 to S14 correspond to the polarization data acquiring step (calculating process), and step S15 corresponds to the image synthesizing step (producing process).

First, at step S11, the image processing apparatus 101 acquires three input images (captured images).

Figure 6A:
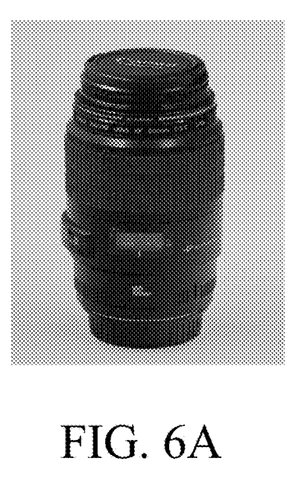
FIGS. 6A to 6C illustrate three input images in Embodiment 1.
Figure 6B:
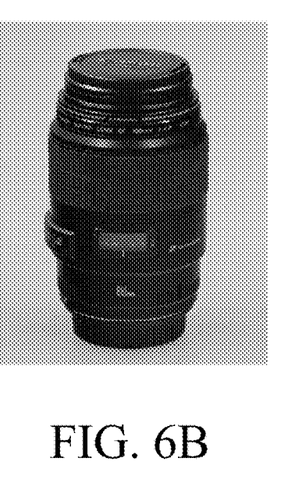
Figure 6C:
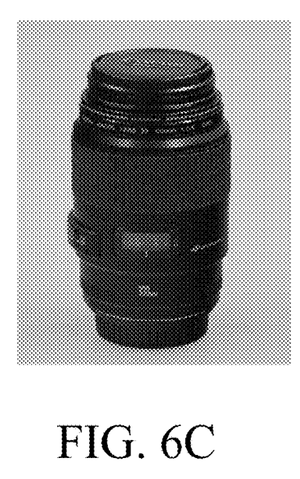
Figure 7A:
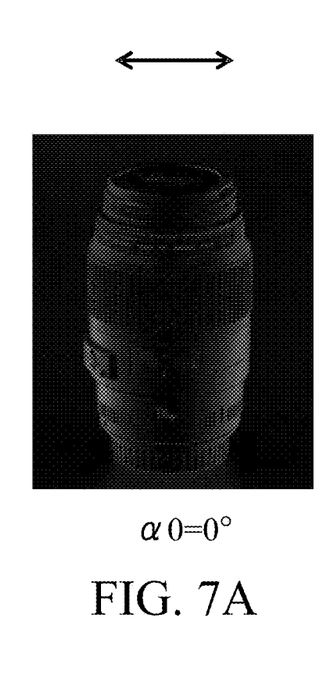
FIGS. 7A to 7D illustrate images of $I'(\alpha 0+90)$ in Embodiment 2.
Figure 7B:
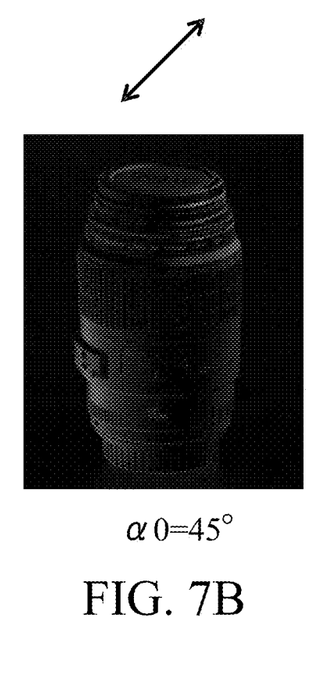
Figure 7C:
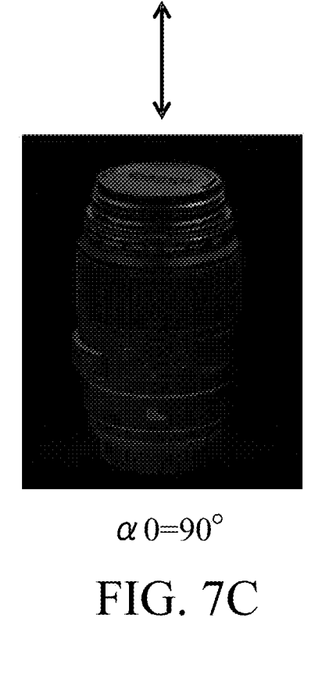
Figure 7D:
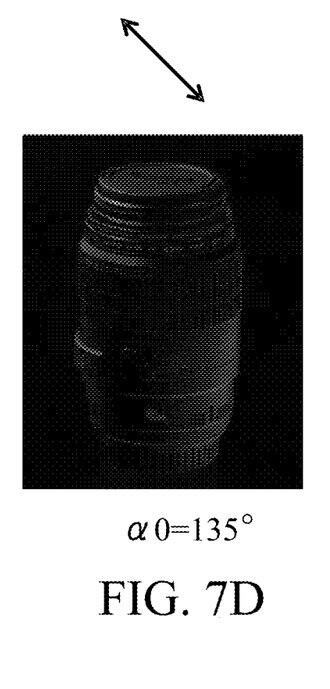
Figure 8A:
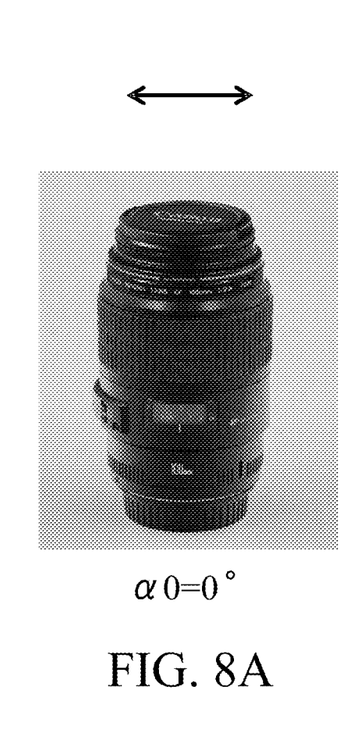
FIGS. 8A to 8D illustrate an example of output images in Embodiment 2.
Figure 8B:
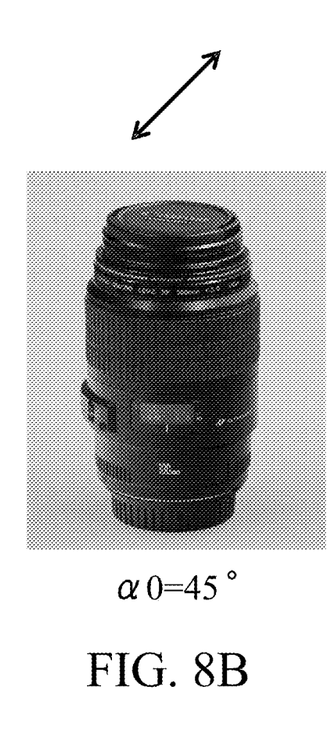
Figure 8C:
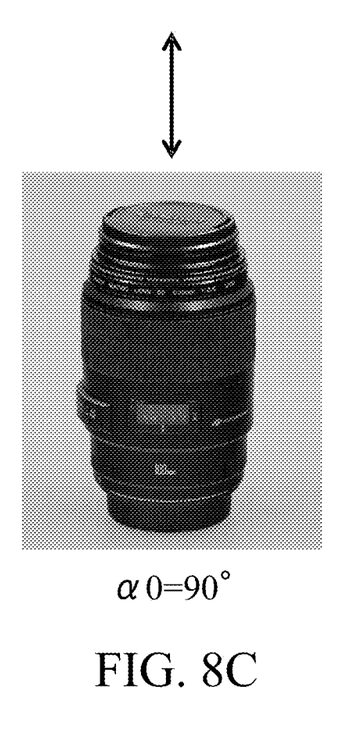
Figure 8D:
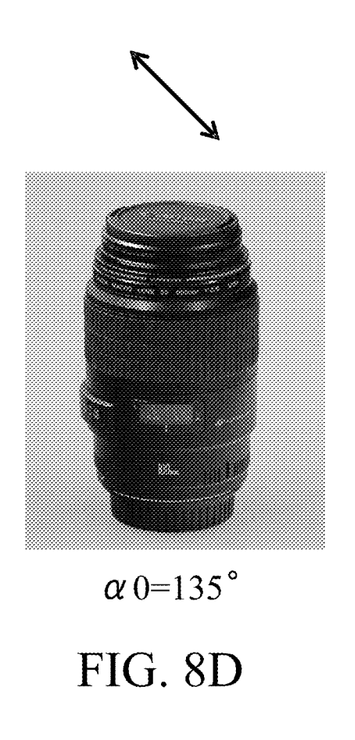

FIGS. 6A to 6C illustrate examples of the three acquired input images. These input images are acquired, as described above, by image capturing of the three polarized lights whose polarization directions α are 20°, 65° and 110°.

Next, at step S12, the image processing apparatus 101 extracts luminance values $I_{20}$, $I_{65}$ and $I_{110}$ of mutually corresponding pixels in the three input images. The image processing apparatus 101 performs the extraction of the luminance values $I_{20}$, $I_{65}$ and $I_{110}$ of the mutually corresponding pixels for entire pixels of the input images. If the three input images have a relative positional displacement therebetween, the image processing apparatus 101 performs, before the extraction of the luminance values, a correction process for matching relative positions of the three input images. The relative position matching may use a position-matching algorithm generally used in image processing. For example, a positional displacement amount between the input images is estimated depending on feature amounts of the respective input images, and then a position matching process is performed so as to decrease the positional displacement amount to 0.

Next, at step S13, the image processing apparatus 101 calculates, from the extracted luminance values $I_{20}$, $I_{65}$ and $I_{110}$ of the mutually corresponding pixels, the above-described angle-dependent component I(α) and angle-independent component Ic at those mutually corresponding pixels. Specifically, the image processing apparatus 101 acquires, from the luminance values $I_{20}$, $I_{65}$ and $I_{110}$ acquired at step S12 and following simultaneous equations (16) to (18) derived from expression (7), A, θ and Ic in I(α).

$$I_{20}=A\ cos^2(20-\theta)+Ic \quad (16)$$

$$I_{65}=A\ cos^2(65-\theta)+Ic \quad (17)$$

$$I_{110}=A\ cos^2(110-\theta)+Ic \quad (18)$$

Next, at step S14, the image processing apparatus 101 calculates, using the calculated angle-dependent component I(α), the approximated value I'(α0+90) of the specular reflection component acquired at the mutually corresponding pixels when the object is illuminated from the direction α0, that is, the angle-dependent component (approximated value) at the specific polarization angle α0.

Hereinafter, a case will be described where α0=0°, 45°, 90° and 135°. The image processing apparatus 101 calculates the approximated value I'(α0+90) of the specular reflection component using the angle-dependent component I(α) and following expressions (19) to (22).

$$I'(0+90)=A\ cos^2(0+90-\theta)+Ic \quad (19)$$

$$I'(45+90)=A\ cos^2(45+90-\theta)+Ic \quad (20)$$

$$I'(90+90)=A\ cos^2(90+90-\theta)+Ic \quad (21)$$

$$I'(125+90)=A\ cos^2(135+90-\theta)+Ic \quad (22)$$

FIGS. 7A to 7D illustrate images having the approximated values I'(α0+90) calculated from expressions (19) to (22). The directions α0 are illustrated by arrows above the images. As understood from these drawings, using the luminance values expressed by I'(α0+90) enables acquiring images close to the captured images of the specular reflection component acquired when the object is illuminated from the direction α0.

Next, at step S15, the image processing apparatus 101 synthesizes the output image. Specifically, the image processing apparatus 101 synthesizes the output image by calculating luminance values of respective pixels using I'(α0+90) calculated at step S14 and expression (9).

FIGS. 8A to 8D illustrate examples of output images acquired when, in expression (9), k and kc are set to k=1.5 and kc=1.0. The directions α0 are also illustrated by arrows above the images. As understood from these drawings, output images as images acquired when the object is illuminated from the direction α0 are each produced from a sum of the angle-independent component Ic and the approximated value I'(α0+90).

Figure 9A:
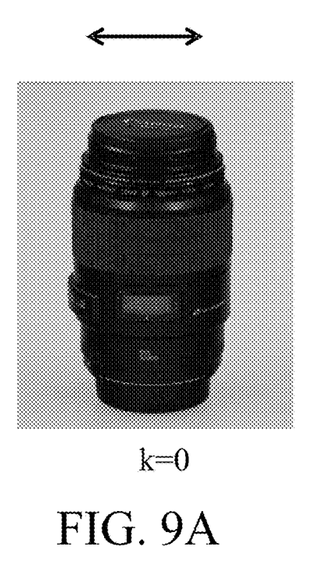
FIGS. 9A to 9C illustrate another example of the output images in Embodiment 2.
Figure 9B:
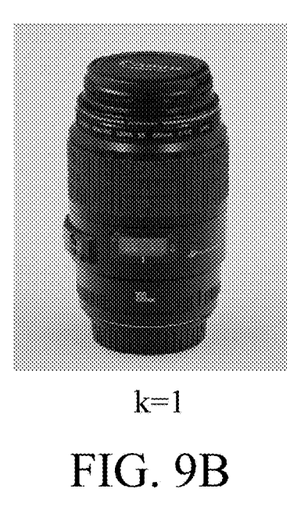
Figure 9C:
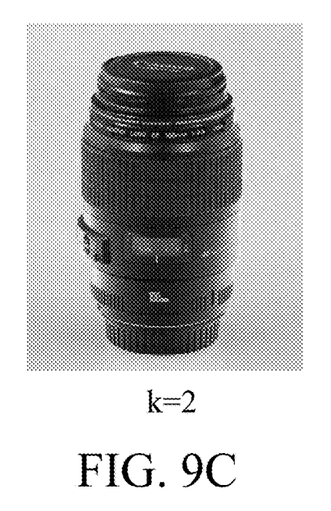

FIGS. 9A to 9C illustrate other examples of output images acquired when, in expression (9), α0=0°, kc=1.0, and k is changed to 0, 1 and 2. As understood from these drawings, changing the coefficient k enables providing output images whose illumination intensity from a specific direction is adjusted.

Figure 10A:
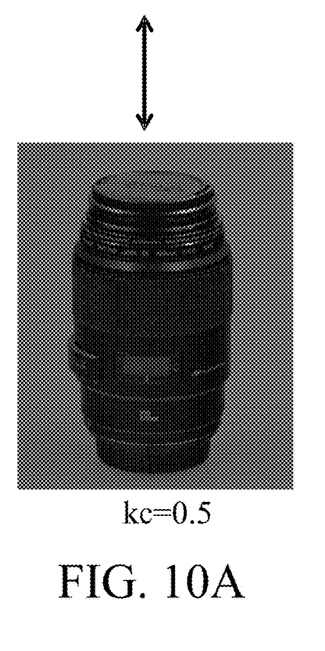
FIGS. 10A to 10C illustrate yet another example of the output imaged in Embodiment 2.
Figure 10B:
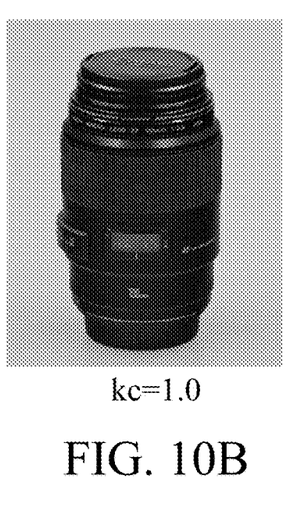
Figure 10C:
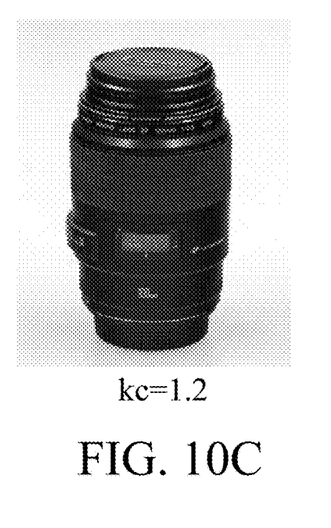

FIGS. 10A to 10C illustrate further other examples of output images acquired when, in expression (9), α0=90°, k=1.0, and kc is changed to 0.5, 1.0 and 1.2. As understood from these drawings, changing the coefficient kc enables providing a changing effect on a base luminance in the output image.

Although the image process of this embodiment described the case of using the input images acquired by image capturing of the polarized lights whose polarization angles α are 20°, 65° and 110°, the polarization angles α of the captured polarized lights are not limited thereto. For example, four input images acquired by image capturing of polarized lights whose polarization angles α are 0°, 45°, 90° and 135° may be used, and five or more input images may be used. In addition, input images acquired by image capturing of polarized lights whose polarization angles α are 0°, 30° and 90° as angles at unequal intervals may be used.

Embodiment 3

Description will be made of another image process, which is performed by the image processing apparatus 101 described in Embodiment 1, as a third embodiment (Embodiment 3) of the present invention. The image process of this embodiment includes steps common to steps S11 to S13 described in Embodiment 2, and description thereof is omitted. Description will be made of the calculation of the angle-dependent component at the specific polarization angle at step S14 and the output image synthesis at step S15, which are different from Embodiment 2.

The image processing apparatus 101 of this embodiment calculates at step S14 the approximated value I' ($\alpha$0+90) of the specular reflection component using I($\alpha$) and F($\alpha$) expressed by following expressions (23) to (25).

Figure 11A:
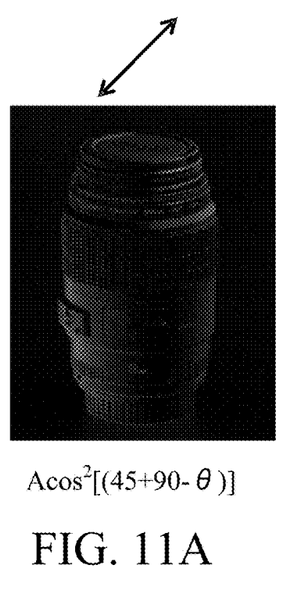
FIGS. 11A to 11C illustrate images of $I'(\alpha 0+90)$ in Embodiment 3.
Figure 11B:
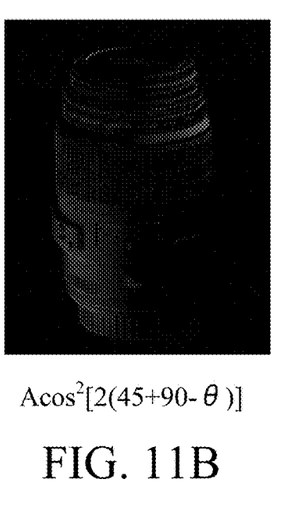
Figure 11C:
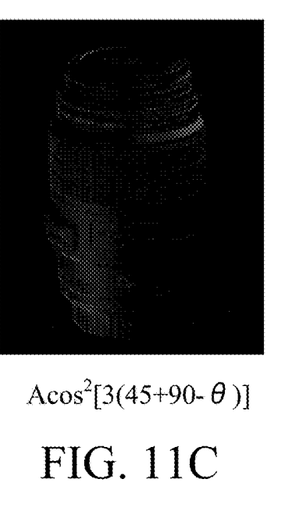

FIGS. 11A to 11C illustrate the approximated values I'($\alpha$0+90) when $\alpha$=45°.

$$I(\alpha) = A\cos^2[1(\alpha - \theta)] \tag{23}$$

$$F(\alpha) = \begin{cases} A\cos^2[2(\alpha - \theta)] & (\theta - \pi/4 \le \alpha \le \theta + \pi/4) \\ 0 & (\alpha < \theta - \pi/4, \theta + \pi/4 < \alpha) \end{cases} \tag{24}$$

$$F(\alpha) = \begin{cases} A\cos^2[3(\alpha - \theta)] & (\theta - \pi/6 \le \alpha \le \theta + \pi/6) \\ 0 & (\alpha < \theta - \pi/6, \theta + \pi/6 < \alpha) \end{cases} \tag{25}$$

The luminance value of the angle-dependent component I($\alpha$) expressed by expression (23) changes depending on the polarization angle $\alpha$ at a cycle of 180°, and on the other hand, the luminance values of the approximation functions F($\alpha$) expressed by expressions (24) and (25) change depending on the polarization angle $\alpha$ at cycles of 90° and 60°, respectively. As understood from FIGS. 11A to 11C, shortening the cycle of the function used for calculating I'($\alpha$0+90) enables a narrowing effect on the illuminated area (width).

Figure 12A:
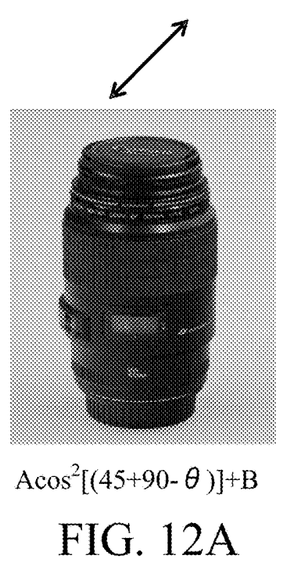
FIGS. 12A to 12C illustrate an example of output images in Embodiment 3.
Figure 12B:
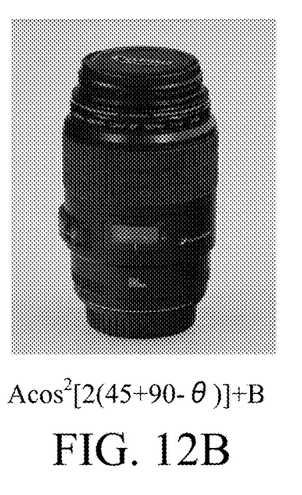
Figure 12C:
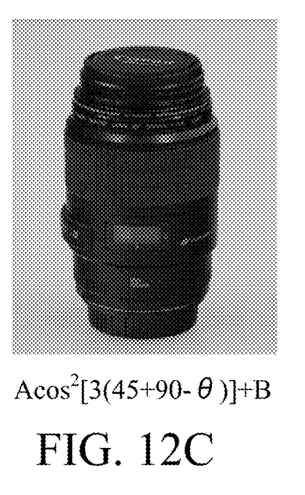

The image processing apparatus 101 of this embodiment calculates at step S15 the luminance value of each pixel using expression (9) and I'($\alpha$0+90) calculated from F($\alpha$) to synthesize the output image. FIGS. 12A to 12C illustrate examples of the output images when k=1.0, kc=1.0 and $\alpha$0=45°. As understood from FIGS. 12A to 12C, using the approximation function F($\alpha$) different from the angle-dependent component I($\alpha$) enables providing an output image corresponding to an illumination condition different from that when the input image(s) is acquired.

Although this embodiment provides the narrowing effect on the illuminated width by using the approximation function F($\alpha$) different from the angle-dependent component I($\alpha$), an arbitrary approximation function F($\alpha$) may be used.

Embodiment 4

Description will be made of further another image process, which is performed by the image processing apparatus 101 described in Embodiment 1, as a fourth embodiment (Embodiment 4) of the present invention. The image process of this embodiment includes steps common to steps S11 to S14 described in Embodiment 2, and description thereof is omitted. Description will be made of the output image synthesis at step S15, which is different from Embodiments 2 and 3. The image processing apparatus 101 of this embodiment calculates at step S15 the approximated value I'($\alpha$0+90) of the specular reflection component by a different method from those in Embodiments 2 and 3.

Although the image processing apparatuses 101 of Embodiments 2 and 3 synthesize the output image using one specific polarization angle $\alpha$0, the image processing apparatus 101 of this embodiment synthesizes, using the approach according to above expressions (24) and (4), the output image using multiple specific polarization angles $\alpha$1 to $\alpha$3. For example, the image processing apparatus 101 of this embodiment calculates, using the approximation function F($\alpha$) expressed by expression (24) when $\alpha$1=90°, $\alpha$2=45° and $\alpha$3=135°, approximated values I'($\alpha$1+90), I'($\alpha$2+90) and I'($\alpha$3+90) of the specular reflection component at each pixel.

Figure 13A:
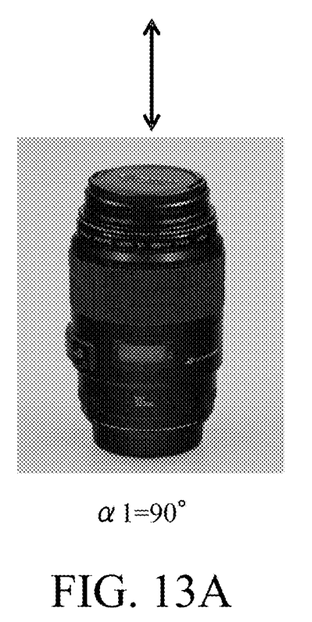
FIGS. 13A to 13C illustrate an example of output images in Embodiment 4.
Figure 13B:
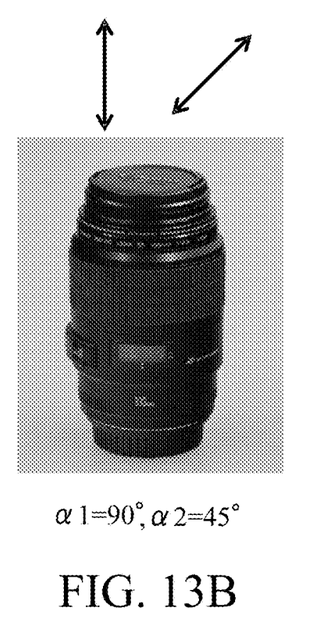
Figure 13C:
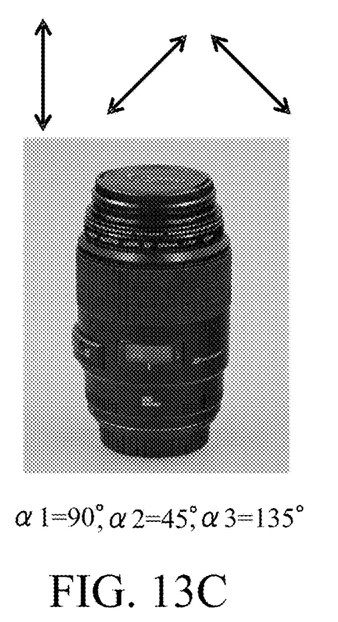

FIGS. 13A to 13C illustrate examples of the output images in this embodiment. The output image of FIG. 13A is acquired when the object is illuminated from a direction of 90°, and the output image of FIG. 13B is acquired when the object is illuminated from, in addition to the direction of 90°, a direction of 45°. The output image of FIG. 13C is acquired when the object is illuminated from, in addition to the directions of 90° and 45°, a direction of 135°. As understood from FIGS. 13A to 13C, synthesizing the output image using the approximated values at the multiple polarization angles enables providing an output image equivalent to an image acquired when the object is illuminated from multiple directions.

Each embodiment described above enables providing, from the input image(s) acquired by image capturing of the multiple polarized lights whose polarization directions are mutually different, an output image in which the illumination direction to the object is arbitrarily selected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-123212, filed on Jun. 22, 2016, which is hereby incorporated by reference herein in its entirety.

What is claimed is:

1. An image processing apparatus comprising a processor configured to execute a plurality of tasks including:
a separating task configured to separate luminance values in each pixel of one or more input images produced by photoelectric conversion of multiple polarized lights whose polarization angles are mutually different into a dependent component that is a luminance component which changes depending on the polarization angle and an independent component that is a luminance component which is not dependent on the polarization angle;
an acquiring task configured to acquire a specific component at a specific polarization angle in the dependent component; and
a producing task configured to produce an output image using the specific component.

2. The image processing apparatus according to claim 1, wherein the acquiring task is configured to acquire a function of the polarization angle for the dependent component and to acquire the specific component using the function.

3. The image processing apparatus according to claim 2, wherein the acquiring task is configured to acquire the function using a maximum value of the dependent component and the polarization angle corresponding to the maximum value.

4. The image processing apparatus according to claim 2, wherein the acquiring task is configured to acquire the function by performing fitting to the luminance values of the one or more input images.

5. The image processing apparatus according to claim 4, wherein the acquiring task is configured to perform the fitting using a sine function or a cosine function.

6. The image processing apparatus according to claim 2, wherein the acquired function is different from the sine function and the cosine function.

7. The image processing apparatus according to claim 1, wherein the producing task is configured to produce the output image using the independent component and the specific component.

8. The image processing apparatus according to claim 7, wherein the producing task is configured to produce the output image using a linear sum of the independent component and the specific component.

9. The image processing apparatus according to claim 1, wherein the producing task is configured to produce the output image using the multiple dependent components at multiple specific polarization angles.

10. The image processing apparatus according to claim 1, wherein:
the one input image is constituted by multiple images; and
the multiple images are produced by the photoelectric conversion of the polarized lights whose polarization angles are mutually different.

11. The image processing apparatus according to claim 1, wherein the input image includes luminance data corresponding to the polarized lights whose polarization angles are mutually different.

12. An image-capturing apparatus comprising:
an image sensor configured to photoelectrically convert polarized lights whose polarization angles are mutually different; and
the image processing apparatus according to claim 1.

13. An image processing method comprising the steps of:
separating luminance values in each pixel of one or more input images produced by photoelectric conversion of multiple polarized lights whose polarization angles are mutually different into a dependent component that is a luminance component which changes depending on the polarization angle and an independent component that is a luminance component which is not dependent on the polarization angle;
acquiring a specific component at a specific polarization angle in the dependent component; and
producing an output image using the specific component.

14. A non-transitory computer-readable storage medium for storing a computer program to cause a computer to execute the image processing method according to claim 13.

15. The image processing apparatus according to claim 1, wherein the specific polarization angle is common to each pixel in the output image.

16. The image processing apparatus according to claim 1, wherein the acquiring task is configured to acquire a first function indicating the dependent component for each of the polarization angles, approximate the first function with a second function, and acquire the specific component using the second function.

17. The image processing apparatus according to claim 16, wherein in the first and second functions, the polarization angles corresponding to the maximum value of the dependent component are equal to each other, and cycles of change of the dependent component are different from each other.

* * * * *